(No Model.)
W. J. FRANCISCO.
THREE WHEELED VEHICLE.
No. 395,388. Patented Jan. 1, 1889.
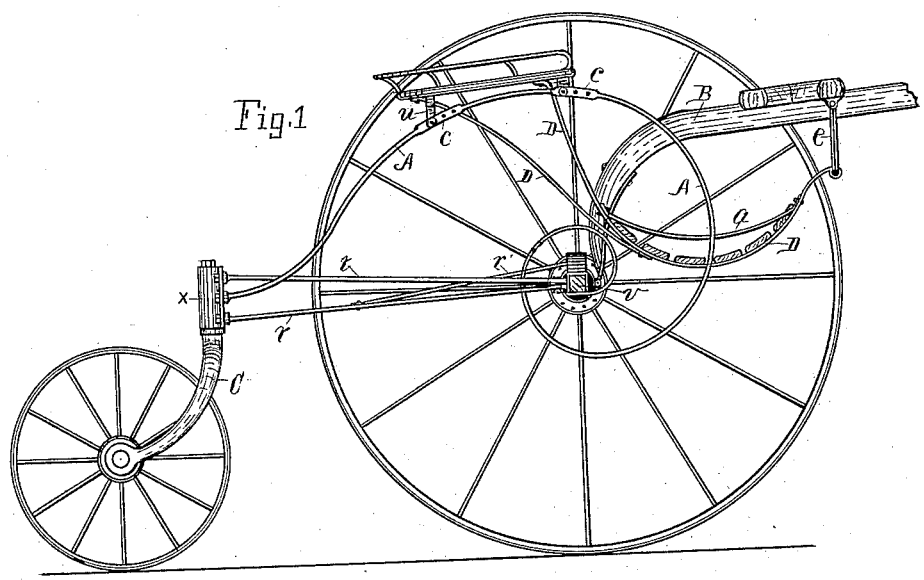
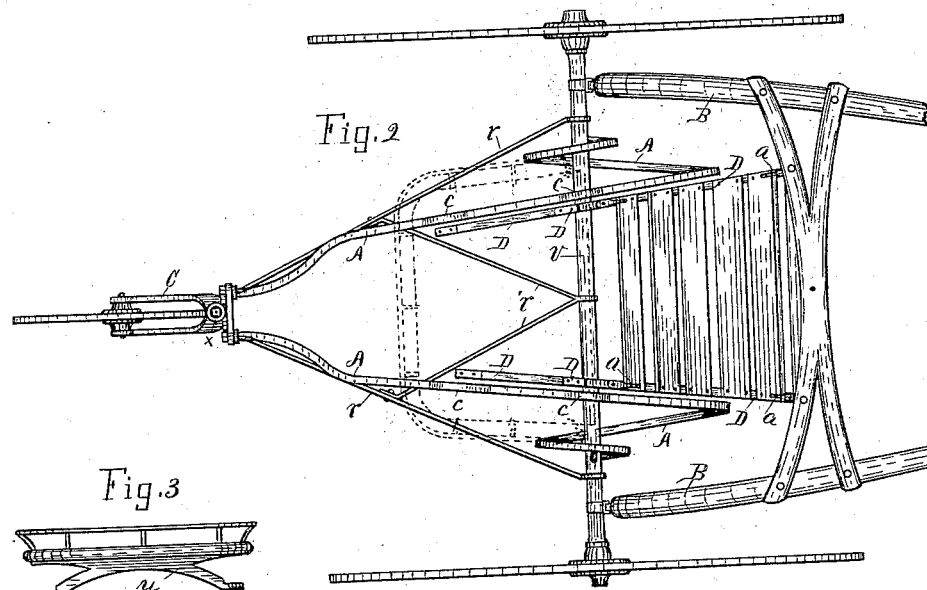
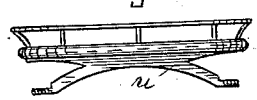
Witnesses.
John C. Perkins
Henry G. M. Howard
Inventor.
William J. Francisco
By Lucius C. West
atty

UNITED STATES PATENT OFFICE.

WILLIAM J. FRANCISCO, OF CERESCO, MICHIGAN.

THREE-WHEELED VEHICLE.

SPECIFICATION forming part of Letters Patent No. 395,388, dated January 1, 1889.

Application filed March 19, 1888. Serial No. 267,593. (No model.)

*To all whom it may concern:*

Be it known that I, WILLIAM J. FRANCISCO, a citizen of the United States, residing at Ceresco, county of Calhoun, State of Michigan, have invented a new and useful Three-Wheeled Vehicle, of which the following is a specification.

The object of this invention is to produce a three-wheeled vehicle for use with a horse the same as the ordinary two-wheeled vehicles are used.

In the drawings forming a part of this specification, Figure 1 is a side elevation with one wheel removed; Fig. 2, a plan, and Fig. 3 is a rear view of the seat.

Referring to the letters of reference marked on the drawings, $v$ is the wheeled axle; B, the thills, and D the seat-bars or body elastically supported over the axle.

Thus far described the construction constitutes a two-wheeled vehicle or road-cart somewhat like those in common use. At $x$ is a thimble, in which is swiveled the pendent bar C, bearing the third wheel of the vehicle. The thimble $x$ is attached to the axle by rods $r\ r$, and these rods are braced by the V-brace $r'$, attached to them and to the center of the axle $v$, Fig. 2. The seat-bars or body is supported by the springs A, which are attached to the axle, circle around the same, bow forward, upward, and rearward beneath the seat, thence downward and rearward, and are attached to the thimble $x$.

At C C the springs A are re-enforced and provided with a series of holes, as in Fig. 1. Into these holes the threaded ends of the seat-bolsters $u$ are inserted. Nuts are to be screwed onto the ends of the bolsters $u$, or keys may be employed; or the ends of the bolsters may be otherwise attached to the springs, either adjustably or not, or the seat may be directly attached to the springs. When made as in Fig. 1, the seat can be adjusted for heavy or light persons by thus changing the leverage on the springs.

At $a$ are braces to the curved part of the seat-bars, and $e$ are leather straps sustaining the forward end of the body from the cross-bar of the thills. The thills are shackled to the axle the same as in a four-wheeled vehicle, and hence there is no horse motion.

The three-wheeled vehicle is lighter and easier of draft than a four-wheeled vehicle, and has all the conveniences of a two-wheeled vehicle, aside from the additional advantages derived from having the third wheel.

Having thus described my invention, what I claim is—

1. In a vehicle, the combination of the axle, the thills shackled thereto, a body or seat-bars, the springs bowing from the axle upward and rearward and supporting the body or seat, thence extending rearward and downward, a thimble attached to the ends of said springs, rods attached to said thimble and to the axle, and a bar bearing a wheel swiveled in said thimble, substantially as set forth.

2. The combination of the axle, the springs, the third wheel, and the body flexibly hung at the forward end and adjustably supported at the rear end by the springs, substantially as set forth.

3. The combination of the body flexibly hung at the forward end, the upwardly-bowed springs having the re-enforced portions with series of holes, and the bolsters attached beneath the seat to the body and adjustably connected at their ends with said holes, substantially as set forth.

In testimony of the foregoing I have hereunto subscribed my name in presence of two witnesses.

WM. J. FRANCISCO.

Witnesses:
J. F. CARNES,
GEORGE INGERSOLL.